(12) United States Patent
Polak et al.

(10) Patent No.: US 10,764,262 B2
(45) Date of Patent: Sep. 1, 2020

(54) APPARATUSES AND METHODS FOR GENERATING DOMAIN-SPECIFIC CODES

(71) Applicant: NXP B.V., Eindhoven (NL)

(72) Inventors: Piotr Polak, Eindhoven (NL); Sujan Pandey, Waalre (NL)

(73) Assignee: NXP B.V., Eindhoven (NL)

( * ) Notice: Subject to any disclaimer, the term of this patent is extended or adjusted under 35 U.S.C. 154(b) by 44 days.

(21) Appl. No.: 15/783,077

(22) Filed: Oct. 13, 2017

(65) Prior Publication Data

US 2019/0116165 A1    Apr. 18, 2019

(51) Int. Cl.
*H04L 29/06* (2006.01)
*H04L 12/715* (2013.01)
*H04W 4/48* (2018.01)

(52) U.S. Cl.
CPC .............. *H04L 63/06* (2013.01); *H04L 45/04* (2013.01); *H04L 63/0428* (2013.01); *H04L 63/0435* (2013.01); *H04L 63/068* (2013.01); *H04L 63/1441* (2013.01); *H04L 63/1475* (2013.01); *H04L 63/162* (2013.01); *H04L 2463/061* (2013.01); *H04W 4/48* (2018.02)

(58) Field of Classification Search
CPC ... H04L 63/06; H04L 45/04; H04L 2463/061; H04L 63/0428; H04L 63/0435; H04L 63/068; H04L 63/1441; H04L 63/1475; H04L 63/162; H04W 4/48
See application file for complete search history.

(56) References Cited

U.S. PATENT DOCUMENTS

| 5,583,933 | A | 12/1996 | Mark |
| 6,092,191 | A * | 7/2000 | Shimbo ............... H04L 63/0428 380/258 |
| 7,853,691 | B2 | 12/2010 | Elzur et al. |
| 7,942,324 | B2 * | 5/2011 | Chabanne ............. H04L 9/0858 235/439 |
| 7,987,367 | B2 | 7/2011 | Yao et al. |
| 8,948,387 | B2 * | 2/2015 | Nica ....................... H04L 63/06 380/260 |

(Continued)

OTHER PUBLICATIONS

Stanley, D. Y. "Resolutions to CID 291 and Similar; comments", IEEE 802.11-09/0490r1, pp. 1-7 (May 2009).

(Continued)

*Primary Examiner* — Michael Simitoski
(74) *Attorney, Agent, or Firm* — Rajeev Madnawat

(57) ABSTRACT

An example communications apparatus includes a plurality of communicatively-interconnected communication domains and an electronic switch, integrated as part of a first domain of the plurality of communicatively-interconnected communications domains. The electronic switch effects secure communications of data over the one or more channels specific to the first domain, by using a first circuit and a second circuit. The first circuit is used to obtain and process sampled channel properties associated with the one or more channels specific to the first domain. The second circuit is used to generate, in response to the first circuit, a domain-specific code that is generated pseudo-randomly using the processed sampled channel properties, the domain-specific code being used for coding data conveyed over the one or more channels specific to the first domain.

20 Claims, 4 Drawing Sheets

(56) References Cited

U.S. PATENT DOCUMENTS

| | | |
|---|---|---|
| 9,124,580 B1 * | 9/2015 | Sampigethaya ......... H04B 3/54 |
| 9,130,771 B2 | 9/2015 | Millington et al. |
| 9,330,561 B2 | 5/2016 | Proud |
| 9,489,023 B1 | 11/2016 | Ispas |
| 2007/0230393 A1 | 10/2007 | Sinha et al. |
| 2007/0294496 A1 | 12/2007 | Goss et al. |
| 2008/0102859 A1 | 5/2008 | Karr et al. |
| 2012/0054522 A1 | 3/2012 | Huang et al. |
| 2012/0159147 A1 | 6/2012 | Ando |
| 2014/0282877 A1 | 9/2014 | Mahaffey et al. |
| 2015/0156179 A1 | 6/2015 | Nica |
| 2015/0172918 A1 | 6/2015 | Wu et al. |
| 2015/0381357 A1 * | 12/2015 | Guillaume ............ H04W 12/04 380/44 |
| 2017/0012771 A1 * | 1/2017 | Mueller ................ H04L 9/0875 |
| 2017/0171749 A1 * | 6/2017 | Huth ..................... H04L 9/0875 |
| 2017/0324646 A1 * | 11/2017 | Johnsen ................. H04L 47/20 |
| 2017/0339512 A1 | 11/2017 | Wang et al. |
| 2018/0013583 A1 | 1/2018 | Rubenstein et al. |
| 2019/0116029 A1 | 4/2019 | Pandey et al. |
| 2019/0202447 A1 | 7/2019 | Taniguchi et al. |

OTHER PUBLICATIONS

L. Chen, "Recommendation for Key Derivation Using Pseudorandom Functions," NIST Special Publication 800-108 (Oct. 2009).

Non-Final Rejection for U.S. Appl. No. 15/783,018, 58 pgs. (dated Apr. 18, 2019).

Final Rejection for U.S. Appl. No. 15/783,018, 58 pgs., (dated Oct. 17, 2019).

Xin, Y. et al. "Space-Time Constellation-Rotating Codes Maximizing Diversity and Coding Gains*", IEEE Gobal Telecommunications Conference, pp. 455-459 (Nov. 2001).

Notice of Allowance for U.S. Appl. No. 15/783,018, 11 pgs., (dated Jan. 8, 2020).

* cited by examiner

APPARATUSES AND METHODS FOR GENERATING DOMAIN-SPECIFIC CODES

OVERVIEW

Aspects of various embodiments are directed to apparatuses and methods of generating domain-specific codes.

Circuits of a wired communication network can communicate with one another by one or more channels conveying data. To securely communicate, a code, such as a key, can be used to encode the data conveyed over the one or more channels. The network communication device can communicate according to protocols defined by a standard specification. Different codes can be used for coding data conveyed between different sets of devices to prevent or mitigate compromising the entire network or portions thereof by a malicious device identifying the code.

These and other matters have presented challenges to efficiencies of secure communications using domain-specific codes, implementations, for a variety of applications.

SUMMARY

Various example embodiments are directed to issues such as those addressed above and/or others which may become apparent from the following disclosure concerning securely communicating between circuits of a wired communication network by generating domain-specific codes.

In certain example embodiments, aspects of the present disclosure involve a plurality of communicatively-interconnected communication domains, each communication domain including circuits that communicate with one another by one or more channels conveying data. The circuits can securely communicate by generating domain-specific codes used for coding data over the one or more channels, thereby diversifying codes within the wired communication network.

In more specific example embodiments, a communication apparatus includes a plurality of communicatively-interconnected communication domains and an electronic switch. Each of the communication domains includes circuits configured and arranged to communicate with one another by one or more channels conveying data in a wired communication network. The one or more channels are specific to the communications domain. The plurality of communication domains can include a plurality of circuits, and each communication domain includes a different subset of the plurality of circuits. The electronic switch is integrated as part of a first domain of the plurality of communication domains. The electronic switch can effect secure communications over the one or more channels specific to the first domain by using a first circuit and a second circuit. The first circuit is used to obtain and process sampled channel properties associated with the one or more channels specific to the first domain and the associated wired communication network. The second circuit is used to generate, in response to the first circuit, a domain-specific code that is generated pseudo-randomly or randomly using the processed sampled channel properties. The domain-specific code can be used for encoding data conveyed over the one or more channels specific to the first domain. One or more of the first and second circuits, in various aspects, can form part of the electronic switch. In other related-aspects, one or more of the first and second circuit can be separate from and in communication with the electronic switch.

The sample-channel properties and/or the domain-specific code can be uniquely specific to the first domain relative to the other domains in the plurality. For example, the domain-specific codes can be uniquely specific to a respective domain and used to code data conveyed over channels specific to the respective domain. Alternatively and/or in addition, the domain-specific codes can include inter-domain codes that are uniquely specific to two domains and used to code data conveyed between the two domains (and over one or more channels), as further described herein.

The domain-specific code specific to a respective domain, e.g., the first domain, can be generated using a master code (e.g., master key) provisioned to all circuits, including the electronic switch, of the wired communication network. The second circuit can generate the domain-specific code using the master code and the sampled channel properties as inputs to a key derivative function (KDF). In a number of aspects, the sampled channel properties can include or be associated with all circuits of the first domain or a subset of the circuits integrated as part of the first domain. The sampled channel properties can be combined or mixed, in various aspects. As further described herein, the sampled channel properties can include Digital Signal Processor (DSP) channel parameters and the first circuit can obtain the sampled channel properties by measuring the DSP channel parameters of channels associated with the first domain.

In related example embodiments, the domain-specific code can be specific to communications between two domains, which is herein referred to as an "inter-domain code" for ease of reference. The electronic switch integrated as part of the first domain can securely communicate with another electronic switch using a master code to code data conveyed. The electronic switch can securely communicate the sampled channel properties to another electronic switch and can receive other sampled channel properties obtained by the other electronic switch. The other electronic switch can be integrated as part of a second domain of the plurality of communicatively-interconnected communication domains, and can effect secure communications over one or more channels specific to the second domain. The other electronic switch can use another first circuit to obtain and process the other sampled channel properties associated with the one or more channels specific to the second domain and the associated wired communication network and another second circuit to generate a domain-specific code using the other sampled channel properties specific to the second domain. The electronic switch (as well as the other electronic switch) can use the second circuit to generate an inter-domain code that is generated pseudo-randomly or randomly using the sampled channel properties specific to the first domain and the other sampled channel properties specific to the second domain. The inter-domain code can be used for coding data conveyed over one or more channels specific to communications between the first domain and the second domain.

In other specific example embodiments, a communications apparatus is in a wired communication network. The wired communication network includes a plurality of communicatively-interconnected communications domains, and each of the communication domains includes circuits configured and arranged to communicate with one another by one or more channels conveying data in the wired communication network specific to the respective communication domain. The communication apparatus includes an electronic switch, integrated as part of a first domain of the plurality of communications domains. The electronic switch can effect secure communications of data over the one or more channels specific to the first domain by using a first circuit and a second circuit. For example, the electronic switch can use a first circuit to obtain and process sampled channel properties associated with the one or more channels specific to the first domain and the associated wired communication network. The electronic switch can use the second circuit to generate, in response to the first circuit, a domain-specific code that is generated pseudo-randomly or randomly using the processed sampled channel properties.

In related specific example embodiments, a communications apparatus is in a wired communication network. The wired communication network includes a plurality of communicatively-interconnected communications domains, and each of the communication domains includes circuits communicating with one another by one or more channels conveying data in the wired communication network specific to the respective communication domain. The communication apparatus includes an electronic switch, integrated as part of a first domain of the plurality of communicatively-interconnected communications domains. The electronic switch can effect secure communications of data over one or more channels specific to communications between the first domain and a second domain of the plurality of communications domains by using a first circuit, communicating with another electronic switch, and using a second circuit. For example, the electronic switch can use the first circuit to obtain and process sampled channel properties associated with the one or more channels specific to the first domain and the associated wired communication network. The electronic switch can communicate, with the other electronic switch, other sampled channel properties associated with the one or more channels specific to a second domain and the associated wired communication network. The other electronic switch can be integrated as part of the second domain of the plurality of communications domains. The electronic switch can further use the second circuit to generate, in response to the first circuit and the communication, an inter-domain code that is generated pseudo-randomly or randomly using the processed sampled channel properties specific to the first domain and the communicated other sampled channel properties specific to the second domain. The inter-domain code can be used for coding data conveyed over one or more channels specific to communications between the first domain and the second domain. The other electronic switch can also generate the inter-domain code using another first circuit and another second circuit, similarly to that as described above.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
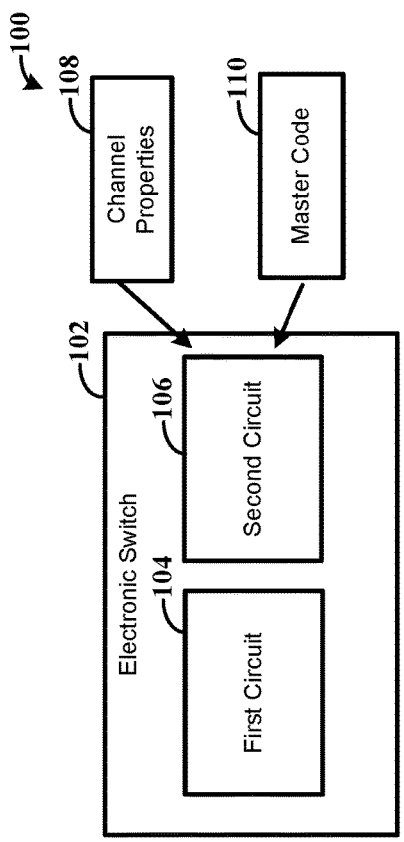
FIG. 1 illustrates an example of a communication apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving securely communicating between circuits of a wired communication network by generating and using domain-specific codes. In certain implementations, aspects of the present disclosure have been shown to be beneficial when used in the context of diversifying codes used for securely communicating data conveyed within a wired communication network by generating the domain-specific codes. In some embodiments, an electronic switch is used to generate the domain-specific code using sampled channel properties of all and/or a subset of circuits of a respective communication domain. Further, the electronic switch can generate an inter-domain code using the sampled channel properties from each communication domain. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments of the present disclosure are directed to techniques used to maintain secure communication between linked circuits of a wired communication network by diversifying codes, such as keys used for securely communicating data. For example, the diversification can include generating domain-specific codes for each communication domain of the wired communication network to diversify codes (e.g., keys) used for coding data conveyed throughout the wired communication network. A wired communication network, such as an Ethernet network, can include a plurality of circuits that communicate with one another by one or more channels (e.g., physical links, such as wires) conveying data. The plurality of circuits can be arranged into a plurality of communicatively-interconnected communication domains in which the respective circuits of a domain communicate with one another by one or more channels specific to the respective domain. For example, a first domain can include a subset of the plurality of circuits of the wired communication network that communicate with one another by one or more channels specific to the first domain. The circuits can securely communicate by coding data using a code, such as a master code (e.g., master key) provisioned to all circuits of the wired communication network. To prevent or mitigate a malicious attack on the wired communication network, domain-specific codes can be generated to diversify codes used throughout the network.

A malicious attack may occur by a passive device listening to data transferred over a data path and potentially identifying the master code over time and/or an active device modifying the data transferred over the data path (such as after learning the master code). The various circuits of the wired communication network can communicate according to a protocol, which can be defined by a standard specification. Some protocols and/or standard specifications may define that the codes used throughout the network be symmetric. A standard specification can describe a set of protocols which may be supported by a governing body, such as the Institute of Electrical and Electronic Engineers (IEEE). For example, particular devices can implement a protocol and comply with a standard specification. To diversify the codes, and which may comply with a standard specification, electronic switches of the wired communication network can be used to generate domain-specific codes for encoding data conveyed over channels specific to respective communication domains and used for encoding data conveyed between two communications domains, which is herein referred to as "inter-domain codes" for ease of reference. Such techniques can be used to automatically diversify symmetric codes between domains and for inter-domain communications by using sampled channel properties associated with one or more channels of the respective domain or between domains (e.g., all circuits or a subset of circuits connected to a single electronic switch). The diversification can allow for provisioning a single master code to all circuits of the wired communication device, and subsequently diversifying within domains and between domains. For example, for an automobile Ethernet network, a single car-specific master key can be provisioned to all circuits of the car, and the keys throughout the wired communication network can diversified using sampled channel properties.

In a number of embodiments, the wired communication network can include a plurality of communicatively-interconnected communication domains. The domains can be defined by an electronic switch and circuits connected directly to the electronic switch. The circuits can be connected to the electronic switch by one or more channels which are used to convey data. The wired communication network can include a plurality of electronic switches, and particular electronic switches can communicate with another by one or more channels conveying data. In specific embodiments, a particular electronic switch can be integrated as a part of a first domain of the plurality of communicatively-interconnected communication domains. The electronic switch can effect secure communications of data over the one or more channels specific to the first domain by using a first circuit and a second circuit. The first circuit can be used to obtain and process sampled channel properties associated (e.g., uniquely associated) with the one or more channels specific to the first domain and the wired communication network. The second circuit can be used to generate a domain-specific code that is generated pseudo-randomly or randomly using the processed sampled channel properties.

The first circuit and/or second circuit can be part of the electronic switch and/or can be separate from the electronic switch (and the electronic switch can retrieve the sampled channel properties from the first circuit). The electronic switch can communicate the domain-specific code, via the one or more channels specific to the first domain, to the circuits integrated as part of the first domain. The domain-specific code can be used for encoding data conveyed over the one or more channels specific to the first domain. In various embodiments, both the sample-channel properties and the domain-specific code are uniquely specific to the first domain relative to the other domains in the plurality. This process can be performed for each of the communication domains of the plurality, such that each communication domain has a unique code, relative to the other domains, which is formed starting from the same master code and using sample channel properties associated with channels specific to the respective domain.

In a number of embodiments, in addition to and/or alternatively, the electronic switch can communicate with another electronic switch to generate an inter-domain code for communications between the first domain and a second domain. For example, the electronic switch can securely communicate, using the master code, the sampled channel properties to the other electronic switch of the wired communication network and receive other sampled channel properties obtained by the other electronic switch and from another other circuits of a plurality of circuit forming a second domain of the plurality of communications domains. The electronic switch can use the second circuit to generate the inter-domain code that is generated pseudo-randomly or randomly using the sampled channel properties of the first domain and the other sampled channel properties of the second domain. The first electronic switch and second electronic switch can use the inter-domain code to encode data conveyed between the first domain and the second domain. The inter-domain code can be uniquely specific to communications between the first domain and second domain relative to communications between the other domains in the plurality.

In related embodiments, the sampled channel parameters can include one or more Digital Signal Processor (DSP) channel parameters associated with channels of the respective communication domain. The channel parameters can be obtained by a respective DSP computing the channel properties. For example, the first circuit can measure the DSP channel parameters of one or more channels associated with the respective domains. The second circuit, which may form part of the electronic switch, can generate the domain-specific code using a master code provisioned to all circuits of the wired communication network, the sampled channel properties, and a key derivative function (KDF). In some embodiments, the second circuit can combine, mix, or randomly use the sampled channel properties to generate a plurality of domain-specific codes that are uniquely specific to the communication domain relative to other domains.

The apparatuses and methods as described herein can be used to generate domain-specific codes, from a master code, that are diversified between different domains using sampled channel properties. The domain-specific codes can be pseudo-randomly or randomly generated to prevent or otherwise mitigate a malicious device, that physically taps to channel (e.g., a wire link), from tampering with and/or learning the domain-specific code and/or from learning a master code used by all circuits of the wired communication network. As the codes are diversified within the network, if a malicious device is able to identify one of the domain-specific codes, the malicious device may be unable to deduct the remaining domain-specific codes and/or inter-domain codes.

A number of embodiments are directed to a communications apparatus that is part of a wired communication network. The wired communication network includes a plurality of communications domains, and each of the communication domains includes circuits that can communicate with one another by one or more channels conveying data and that are specific to the respective communication domain. The communication apparatus includes an electronic switch, integrated as part of a first domain of the plurality of communications domains. The electronic switch can effect secure communications of data over the one or more channels specific to the first domain by using a first circuit and a second circuit. For example, the electronic switch can use a first circuit to obtain and process sampled channel properties associated with the one or more channels specific to the first domain. The electronic switch can use the second circuit to generate, in response to the first circuit, a domain-specific code that is generated pseudo-randomly or randomly using the processed sampled channel properties.

In other-related embodiments, a communications apparatus is in a wired communication network, as described above, includes an electronic switch, integrated as part of a first domain of the plurality of communications domains. The electronic switch can effect secure communications of data over one or more channels specific to communications between a first domain and a second domain of the plurality of communications domains by using a first circuit, communicating with another electronic switch, and using a second circuit. For example, the electronic switch can use a first circuit to obtain and process sampled channel properties associated with the one or more channels specific to the first domain. The electronic switch can communicate, with another electronic switch, other sampled channel properties associated with the one or more channels specific to a second domain. The other electronic switch can be integrated as part of the second domain of the plurality of communications domains. The electronic switch can further use the second circuit to generate, in response to the first circuit and the communication, an inter-domain code that is generated pseudo-randomly or randomly using the processed sampled channel properties and the communicated sampled channel properties. The inter-domain code can be used for coding data conveyed over one or more channels specific to communications between the first domain and the second domain. The other electronic switch can also generate the inter-domain code using another first circuit and another second circuit, similarly to that as described above.

Turning now to the figures, FIG. 1 illustrates an example communication apparatus, in accordance with the present disclosure. The communication apparatus 100 can be part of a wired communication network formed of a plurality of circuits that securely communicate with one by one or more channels conveying data in the wired communication network, such as a high speed wired network. For example, as further illustrated by FIGS. 4 and 5, the wired communication network can include a plurality of communicatively-interconnected communication domains, herein referred to as "communication domains" for ease of reference. Each communication domain includes circuits (e.g., a subset of the plurality of circuit of the network) that communicate with one another by one or more channels conveying data in the wired communication network. The one or more channels are specific to the respective domain. For example, each domain can include an electronic switch connected to a subset of the plurality of circuits of the wired communication network via the channels.

In various embodiments, the secure (and wired) communication can occur via a stored code used to code, e.g., encrypt and decrypt, a data frame. To address attacks, from the above-described passive or active devices, data transferred over channels of the wired communication network can be authenticated and encrypted using a protocol. The communications can occur using protocols defined by a standard specification, such as IEEE 802.1AE. Some communication protocols, like those defined according to IEEE 802.1AE, may not allow for selections of different codes (e.g., keys) for different secure channels. For example, the data transferred can be authenticated and encrypted using Media Access Control Security (MACsec) defined by the IEEE 802.1AE specification, with the MACsec block being provisioned with symmetric keys. Codes within the wired communication network can be diversified by generating domain-specific codes. Each circuit of the wired communication network can have a master code (e.g., master key) provisioned, and which is used to generate domain-specific codes using sampled channel parameters. Example wired communication networks include an Ethernet network, such as an automotive Ethernet network, a local area network (LAN), digital subscriber line (DSL) networks, fiber optic networks, broadband over powerline (BPL), among other types of networks that provide wired communications. Each of the circuits and electronic switches of the network can be provisioned a master code, such as during manufacturing, which can be used to generate domain-specific codes for specific communication domains and for communications between specific communication domains.

As illustrated by FIG. 1, the communication apparatus 100 includes an electronic switch 102. The electronic switch 102 can be integrated as part of a first domain of the plurality of communication domains. The electronic switch 102 can effect secure communications of data over one or more channels specific to the first domain by using a first circuit 104 and a second circuit 106. The first circuit 104 and second circuit 106 can be integrated as part of the electronic switch 102, as depicted by FIG. 1, however embodiments are not so limited and one or more the first and second circuits 104, 106 can be separate from the electronic switch 102.

The first circuit 104 can be used to obtain and process channel properties associated with the one or more channels specific to the first domain and the associated wired communication network. The electronic switch 102 can be coupled to one or more circuits of the network via a channel. The channel properties can include Digital Signal Processor (DSP) channel parameters. For example, the DSP channel parameters of a channel associated with the first domain can be obtained by a DSP associated with the respective channel computing channel coefficients as measured from the channel. The first circuit 104 can include one or more DSPs and/or a sampling circuit used to sample the channel properties from each channel and/or DSPs associated with the first domain.

The second circuit 106 can be used to generate, in response to the first circuit 104, a domain-specific code that is generated pseudo-randomly or randomly using the processed sampled channel properties 108. For example, the second circuit 106 can generate the domain-specific code using the master code 110, the sampled channel properties 108, and a KDF. The master code 110 can be provisioned to each circuit of the wired communication network. As further illustrated herein, the sampled channel properties 108 or a portion thereof and the master code 110 can be inputs to the KDF. In specific embodiments, the second circuit 106 can combine, mix or randomly use the sampled channel properties to generate the domain-specific code and/or a plurality of domain-specific codes. The sampled channel properties used to generate the domain-specific code can include channel properties from channels associated with at least a portions of the circuits, each of the circuits, and/or a subset of the circuits forming the first domain. For example, the second circuit 106 can use a combination or mixture of the sampled channel properties 108 obtained from each of the circuits integrated as part of the first domain and/or the sampled channel properties 108 obtained from a subset of the circuits integrated as part of the first domain.

The domain-specific code can be used for coding data conveyed over the one or more channels specific to the first domain. For example, the electronic switch 102 can communicate, via the one or more channels specific to the first domain, the domain-specific code to the circuits integrated as part of the first domain. The sampled channel properties 108 and the domain-specific code can be uniquely specific to the first domain relative to the other domains of the plurality in the network.

In related embodiments, the communication apparatus 100 can further include the plurality of domains, as further illustrated and described herein. For example, the communication apparatus can include another electronic switch. The other electronic switch can be integrated as part of a second domain of the plurality of domains. The other electronic switch can effect secure communications of data over one or more channels specific to the second domain by using another first circuit and another second circuit to generate a domain-specific code. Similarly to the electronic switch, the other first circuit can be used to obtain (e.g., sample or retrieve from another sampling circuit) and process sampled channel properties associated with the one or more channels specific to the second domain and the associated wired communication network. The other second circuit can be used to generate, in response to the other first circuit, a domain-specific code that is generated pseudo-randomly or randomly using the processed sampled channel properties, the domain-specific code being used for coding data conveyed over the one or more channels specific to the second domain. The sampled channel properties specific to the second domain and the domain-specific code can be uniquely specific to the second domain relative to the other domains of the plurality in the network.

The electronic switch 102 and other electronic switch can securely communicate with one another via the master code 110. For example, and as further described herein in connection with FIGS. 4-5, the electronic switch 102 and other electronic switch can communicate sampled channel properties of the respective first and second domains and can use the respective second circuits to generate an inter-domain code used for coding communications between the first domain and the second domain. As a particular example, the electronic switch 102 can securely communicate, using the master code 110 provisioned to the plurality of circuits of the wired communication network, the sampled channel properties 108 to the other electronic switch of the wired communication network and receive other sampled channel properties obtained by the other electronic switch and from the other circuits forming the second domain. The second circuit 106 of the electronic switch 102, in response, can generate the inter-domain code that is generated pseudo-randomly or randomly using the sampled channel properties of the first domain and the other sampled channel properties of the second domain. The electronic switch 102 and other electronic switch can use the inter-domain code to encode data conveyed between the first domain and the second domain.

Figure 2:
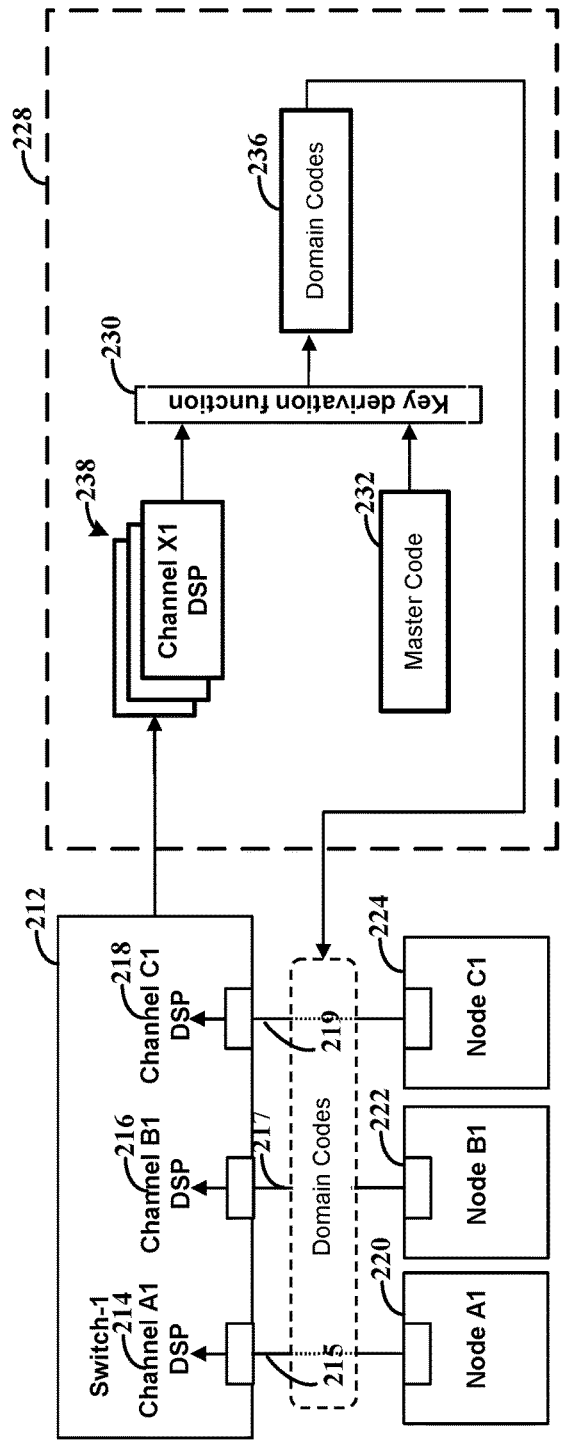
FIG. 2 illustrates an example of a communication apparatus, in accordance with the present disclosure.

FIG. 2 illustrates an example of a communication apparatus of a communication domain, in accordance with the present disclosure. As illustrated, the communication domain can include or be formed of an electronic switch 212 and a plurality of circuit (e.g., nodes) 220, 222, 224 connected to the electronic switch 212 via respective channels 215, 217, 219. Although FIG. 2 depicts one domain, the wired communication network can include a plurality of domains, with each domain being associated with a subset of a plurality of circuits that are within or associated with the wired communication network. The circuits 220, 222, 224 and the electronic switch 212 can securely communicate with one another by the channels 215, 217, 219 conveying data.

A master code 232 can be provisioned to all circuits of the wired communication network. The master code 232, which can be a master key, can be used to generate domain-specific codes 236 (e.g., domain-specific keys) specific to each communication domain. In specific embodiments, the master code 232 is provisioned during manufacturing of the wired communication network. For example, upon a first boot up, testing, and/or each boot up, the electronic switch 212 can obtain and process DSP channel parameters 238 associated with each channel 215, 217, 219 of the respective domain using respective DSPs 214, 216, 218. The DSP channel parameters 238 and the master code 232 can be used as inputs to the KDF 230. In such embodiments, as depicted by FIG. 2, the electronic switch 212 can include or form the first circuit and second circuit, as illustrated by the dashed-line 228 and as previously described in connection with FIG. 1. The inputs to the KDF 230 can include a combination, a mixture and/or a random selection of all of and/or a subset of the DSP channel parameters 238. The KDF 230 can be used to generate the domain-specific codes 236 that are uniquely specific to the communication domain, and the domain-specific codes 236 are securely communicated over the channels 215, 217, 219 to the circuits 220, 222, 224 of the communication domain. For example, the electronic switch 212 can code (e.g., encrypt) the domain-specific codes 236 using the master code 232 and convey the coded domain-specific codes over the channels 215, 217, 219. The electronic switch 212 and each of the circuits 220, 222, 224 integrated as part of the communication domain can include data storage circuits to store the domain-specific codes 236 and subsequently use the domain-specific codes 236 for coding data conveyed over the channels 215, 217, 219.

Figure 3A:
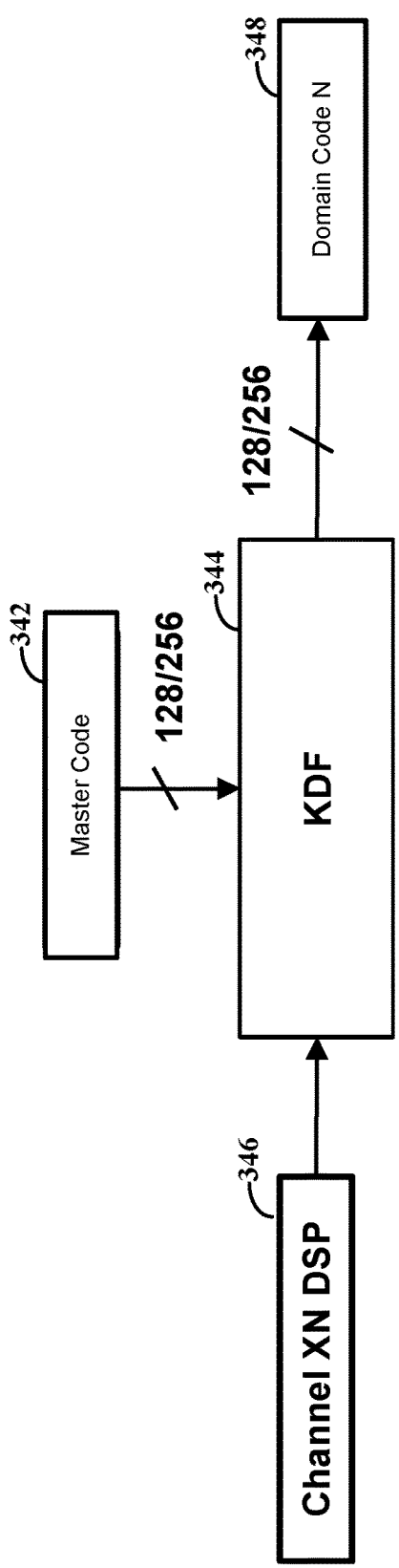
FIGS. 3A-3B illustrates example methods for generating domain-specific codes, in accordance with the present disclosure.
Figure 3B:
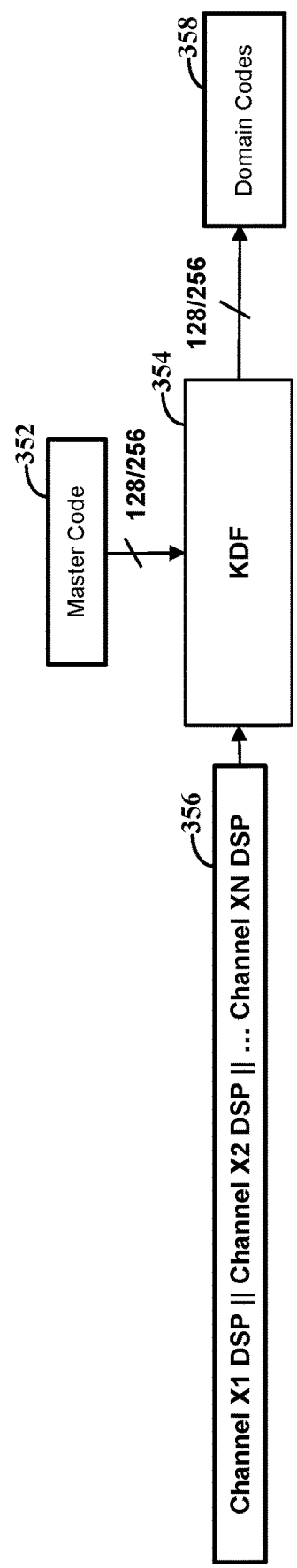

FIGS. 3A-3B illustrates example methods for generating domain-specific codes, in accordance with the present disclosure. In accordance with various embodiments, a KDF (e.g., KDF 344 or 354) can be used to diversify codes within a wired communication network. The KDF can be based on a MAC algorithm, such as Authentication Encryption with Associated Data (AED)-Cipher-based Message Authentication Code (CMAC) or Keyed-hash Message Authentication Code (HMAC).

As illustrated by FIG. 3A, in some embodiments, a domain-specific code can be generated for each channel measurement. For example, the operation can be performed multiple times, once for each channel (e.g., 1 . . . N) to derive a plurality of domain-specific codes that are uniquely specific to a particular communication domain relative to other communication domains of the plurality. For each operation, the channel parameter (as measured) 346 and the master code 342 are input to the KDF 344 to generate and output a derived domain-specific code 348. The process is repeated to obtain a plurality of domain-specific codes.

In other embodiments and/or in addition, as illustrated by FIG. 3B, multiple channel parameter measurements are combined and/or mixed to derive a domain-specific code. The plurality of channel parameters 356 and the master code 352 are input to the KDF 354 to generate and output a domain-specific code 358. As may be appreciated, various embodiments can include combining the process of FIGS. 3A and 3B to generate multiple domain-specific codes using different combinations or mixes of channel parameters.

Figure 4:
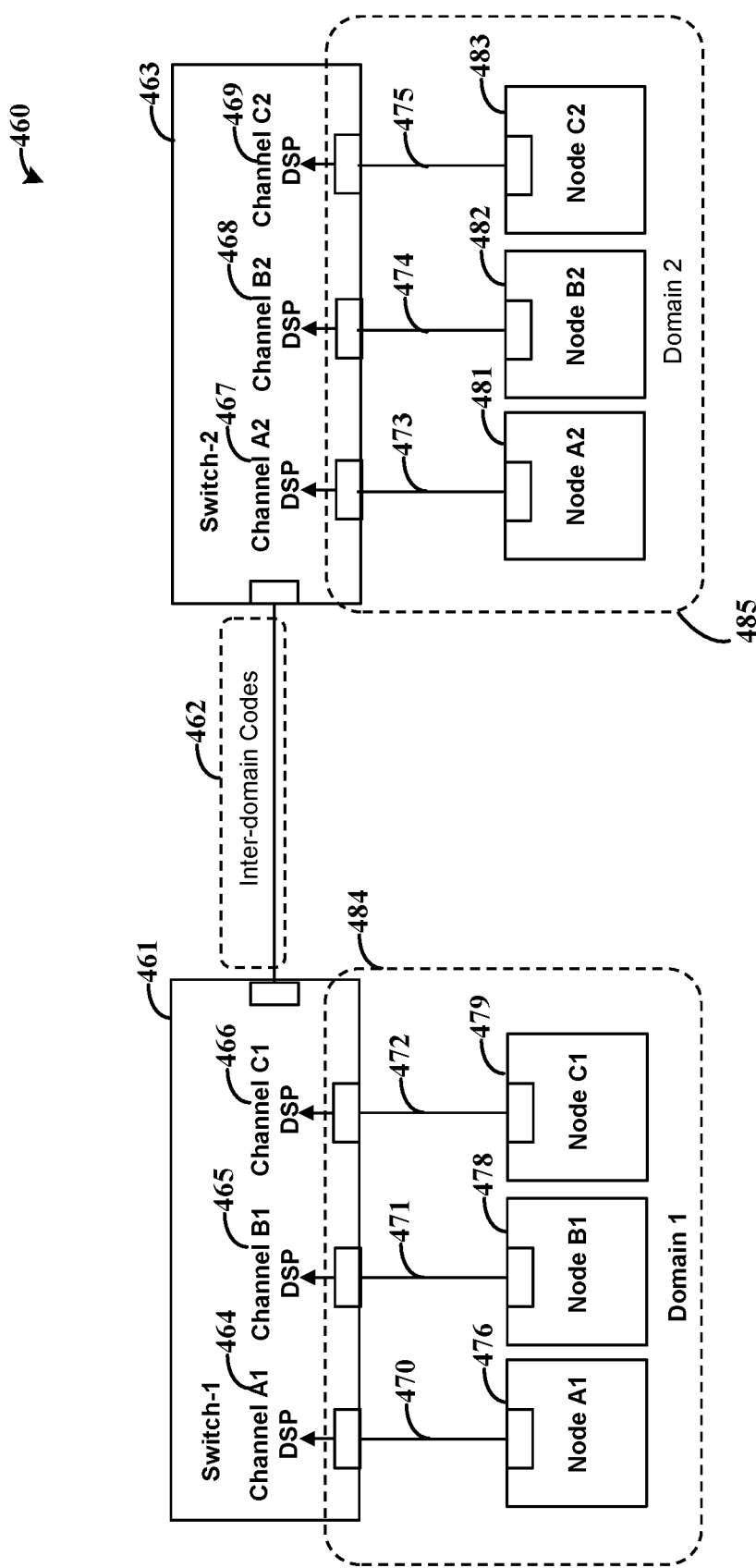
FIG. 4 illustrates an example apparatus including a plurality of electronic switches integrated as part of a plurality of communication domains, in accordance with the present disclosure.
Figure 5:
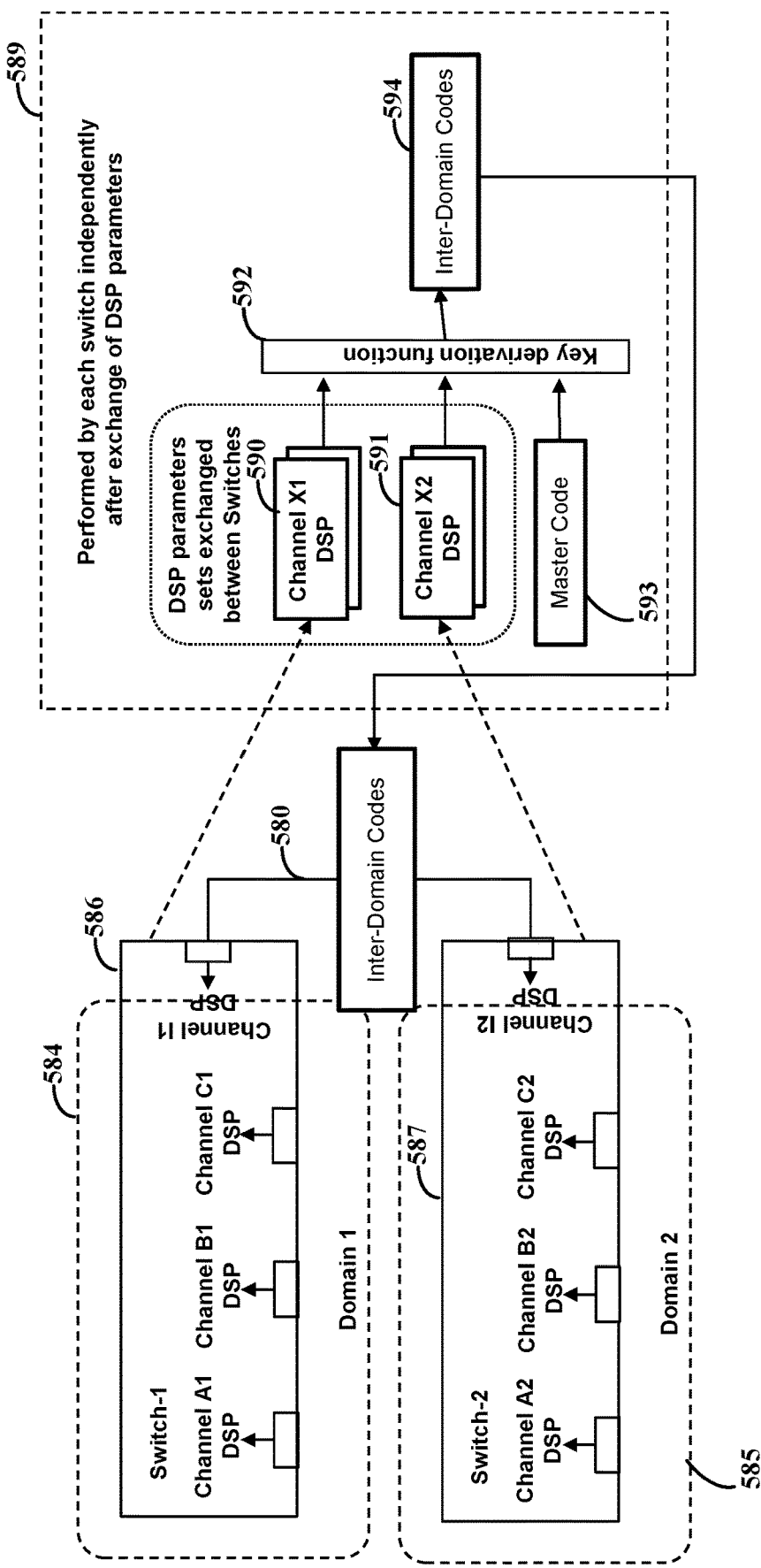
FIG. 5 illustrates an example method for generating inter-domain codes, in accordance with the present disclosure.

As previously described, a number of embodiments can additionally or alternatively include generating inter-domain codes. FIGS. 4-5 illustrate example methods of generating inter-domain codes (e.g., inter-domain keys). Although the embodiments of FIGS. 4-5 illustrate two communication domains, embodiments are not so limited and can include greater than two domains.

FIG. 4 illustrates an example apparatus including a plurality of switches integrated as part of a plurality of communication domains, in accordance with the present disclosure. More specifically, FIG. 4 illustrates at least a portion of a wired communication network 460. The wired communication network 460 can include a plurality of communication domains 484, 485 (e.g., domain 1 and domain 2). Each of the communication domains 484, 485 includes circuits 476, 478, 479, 481, 482, 483 (e.g., nodes A1, B1, C1, A2, B2, C2) communicating with one another by one or more channels specific to the communication domains 484, 485. For example, the wired communication network 460 includes a first domain 484 and a second domain 485. The first domain 484 includes an electronic switch 461 and circuits 476, 478, 479 that communicate with one another by channels 470, 471, 472 that are specific to the first domain 484. The second domain 485 includes another electronic switch 463 and circuits 481, 482, 483 that communicate with one another by channels 473, 474, 475 that are specific to the second domain 485.

As previously described, each of the electronic switches 461, 463 can generate domain-specific codes, that are respectively unique to the first domain 484 and the second domain 485, using first and second circuits. The first and second circuits, in some embodiments, can form part of the electronic switches 461, 463. For example, as previously described, each of the electronic switches 461, 463 can perform measurement of DSP channel parameters of each channel 470, 471, 472, 473, 474, 475 associated with the respective domain 484, 485 using associated DSPs 464, 465, 466, 467, 468, 469. The DSP channel parameters and a master code can be used inputs to the KDF and used to generate the respective domain-specific codes.

The electronic switch 461 and the other electronic switch 463 can generate an inter-domain code (s) 462 used for secure communications between the first domain 484 and the second domain 485. For example, the electronic switch 461 and the other electronic switch 463 can securely communicate respective sampled channel properties of the first domain 484 and the second domain 485 using the master code provisioned to all circuits of the wired communication network 460. The exchanged parameters can be used by the electronic switches 461, 463 to generate the inter-domain codes 462 that are generated pseudo-randomly or randomly using the communicated sampled channel properties specific to the first domain 484 and the second domain 484. For example, the electronic switches 461, 463 can use the second circuits to generate the inter-domain code by inputting the exchanged channel parameters and the master code to the KDF to arrive at the same intersected code set. The inter-domain code can be uniquely specific to communications between the first domain 484 and the second domain 485 relative to communications between other domains of the plurality.

FIG. 5 illustrates an example method for generating inter-domain codes, in accordance with various embodiments. FIG. 5 can illustrate a portion of the wired communication network 460, such as the electronic switches 461, 463, as illustrated by FIG. 4, however embodiments are not so limited. In various embodiments, the wired communication network includes electronic switches 586, 587 that are integrated as part of two communication domains 584, 585 and that can exchange processed sampled channel properties 590, 591. The processed sampled channel properties 590, 591 can be are used by both electronic switches 586, 587 to derive inter-domain codes 594.

For example, and as previously described, a communication apparatus can include an electronic switch 586 integrated as part of a first domain 584 of the plurality of communication domains of the wired communication network. The electronic switch 586 can effect secure communications of data over the one or more channels 580 specific to communications between the first domain 584 and a second domain 585 of the plurality of communication domains using a first circuit and a second circuit, and communicating with the other electronic switch 587. The first circuit and second circuit, in specific embodiments, can form part of the respective electronic switch 586. The functions/components inside the dashed line 589 can illustrate the operations of the first circuit and/or the second circuit. Each of the electronic switch 586 and the other electronic switch 587 can include first and second circuits and can perform the operations illustrated by 589. The electronic switch 586 can use the first circuit (e.g., channel DSPs and/or other sampling circuitry) to obtain and process sampled channel properties 590 associated with the one or more channels specific to the first domain 584 and the associated wired communication network. The electronic switch 586 can communicate, with the other electronic switch 587, other sampled channel properties 591 associated with the one or more channels specific to the second domain 585 and the associated wired communication network. As previously described, the other electronic switch 587 is integrated as part of the second domain 585.

The electronic switch 586 can use the second circuit to generate, in response to the first circuit and the communication, an inter-domain code (s) 594 that is uniquely specific to the first domain 584 and the second domain 585, and that is generated pseudo-randomly or randomly using the processed sampled channel properties 590 and the communicated sampled channel properties 591. The inter-domain code 594 can be used for coding data conveyed over one or more channels 580 specific to communications between the first domain 584 and the second domain 585. For example, the channel parameters 590 as processed by the electronic switch 586 are communicated to the other electronic switch 587 and the channel parameters 591 processed by the other electronic switch 587 are communicated to the electronic switch 586 over a channel 580 and as coded using the master code 593. Each electronic switch 586, 587 uses the channel parameters 590, 591 associated with each domain 584, 585 and the master code 593 as inputs to a KDF 592 and can separately derive the same inter-domain codes 594. Alternatively, one of the electronic switches 586, 587 can derive the inter-domain codes 594 and communicate the inter-domain codes 594 to the other electronic switch securely, such as by coding the inter-domain codes 594 using the master code 593. In such embodiments, the respective channel parameters may only be communicated to the respective electronic switch that is performing the generation.

The communication apparatus, in various embodiments, includes the other electronic switch 587. The other electronic switch 587 can similarly effect secure communications of data over the one or more channels specific to the second domain 585, by using another first circuit and another second circuit. The other first circuit can obtain and process the sampled channel properties 591 associated with the one or more channels specific to the second domain 585 and the associated wired communication network (e.g., via associated DSPs). The other second circuit can generate, in response to the other first circuit, a domain-specific code that is generated pseudo-randomly or randomly using the processed sampled channel properties specific to the second domain 585, the domain-specific code being used for coding data conveyed over the one or more channels specific to the second domain.

Similarly, the electronic switch 586 can communicate the sampled channel properties 590 associated with the one or more channels specific to the first domain 584 and the associated wired communication network to the other electronic switch 587. The other electronic switch 587 can effect secure communications of data over the one or more channels 580 specific to communications between the first domain 584 and a second domain 585 by using the other second circuit to generate, in response to the first circuit and the communication, the inter-domain code(s) 594 that is generated pseudo-randomly or randomly using the processed sampled channel properties 591 specific to the second domain 585 and the communicated sampled channel properties 590 specific to the first domain 584. The other electronic switch 587 can code the other sampled channel properties associated with the one or more channels specific to the second domain using a master code 593.

The above-described methods can be used to determine domain-specific codes and inter-domain codes once or multiple times. For example, the domain-specific codes and inter-domain codes can be generated during manufacturing and stay the same over the lifetime of the network. As a specific example, assume the wired communication network is an automotive Ethernet network. While manufacturing the car, such as during a first boot up or test of the network circuits, the domain-specific codes and inter-domain codes can be generated and stay the same over the lifetime of the car. In other embodiments, the domain-specific codes and inter-domain codes can be generated multiple times, such as periodically and/or at each power on procedure. Using the above-described automotive Ethernet network example, each time the car is turned on, a DSP measurement is made and the domain-specific codes and inter-domain codes are generated. The derived codes can subsequently be used as an input to the KDF, replacing the master code, and providing additional diversification.

In accordance with various embodiments, code diversity within the wired communication network can be provided to prevent or mitigate a malicious attack on the network. An update can be prevented, in some embodiments, by a one-time program (e.g., diode burn). Each circuit and electronic switch in the network can have a master code provisioned at production time, which can streamline the production process. Domain-specific codes that are uniquely specific to each communication domain can be derived independently during testing, first boot up, and/or each boot up based on the unique properties of channels between devices of the domain. In some embodiments, all channel properties are used, and in other embodiments, a subset of channel properties are used. The inter-domain codes that are unique between two domains can be derived from the channel properties of each channel of circuits participating in both respective domains. In a number of specific embodiments, only the electronic switches are in a position to perform the channel parameter measurement to derive the domain-specific codes as the electronic switches are connected to each of the circuits of the domain. A malicious device attempting to attack the network or replace a particular circuit may be prevented from performing all the measurements, as it is not connected to each circuit in the domain.

As may be appreciated by one of ordinary skill, the wired communication network can include a plurality of circuits that securely communicate with one another by one or more channels conveying data in the wired communication network. The network can include a wired communication network, such as an Ethernet network, that uses codes to communicate between pairs of circuits and/or electronic switches. Each pair of devices that communicate to one another are connected via a respective channel, such that each channel is specific to communications between the devices. Each pair of circuits and/or switches that communicate can communicate via a respective secure channel by coding data conveyed over the secure channel using a code (e.g., a key).

Further, as may be appreciated by one of ordinary skill, the wired communication network in various embodiments is not limited to wired communications, and can include a wireless communication, for example, used to extend a wired channel.

The devices and/or systems illustrated herein can be used to implement a variety of methods. An example method, in accordance with various embodiments, includes circuits securely communicating with one another by one or more channels conveying data in the wired communication network and using domain-specific codes for coding the conveyed data. The wired communication network including a plurality of communications domains, each of the communications domains including circuits communicating with one another by one or more channels conveying data in a wired communication network specific to the communications domain. For example, the method includes using a first circuit to obtain and process sampled channel properties associated with the one or more channels specific to a first domain and the associated wired communication network. The method further includes using a second circuit to generate, in response to the first circuit, a domain-specific code that is generated pseudo-randomly or randomly using the processed sampled channel properties, the domain-specific code being used for coding data conveyed over the one or more channels specific to the first domain. The first and second circuits can be part of and/or used by an electronic switch to generate the domain-specific code.

In various embodiments, the method further includes communicating, with another electronic switch integrated as part of the second domain of the plurality of communication domains, other sampled channel properties associated with the one or more channels specific to the second domain and the associated wired communication network. The second circuit is used to generate, in response to the first circuit and the communication, an inter-domain code that is generated pseudo-randomly or randomly using the processed sampled channel properties and the communicated sampled channel properties, the inter-domain code being used for coding data conveyed over one or more channels specific to communications between the first domain and the second domain.

In various embodiments, DSP channel parameters are provided and used as the sampled channel parameters. DSP channel parameters can be obtained from a point-to point network and include channel coefficients computed by a DSP of the respective network communication device. The channel is typically implemented as a physical line and can include wired cable(s), such as a twisted cable (although embodiments are not so limited). For example, the DSP can measure, filter, and/or compress signals associated with the channel to compute the DSP channels parameters (e.g., channel coefficients). The DSP channel parameters can include equalizer tap coefficients and/or echo canceller tap coefficients, among other parameters. DSP channel parameters can change with the length of the channel, the temperature, aging over time, while driving (e.g., when used in automobiles), etc. The DSP associated with a particular circuit can compute the channel coefficients, e.g., the DSP channel parameters, using an adaptive filter. As may be appreciated by one of ordinary skill, the domain-specific code, which can include a rotating key, can be generated using a KDF and the previous value of the key. A KDF can derive one or more secret codes from the previous value of the code. As previously describe, the first value can include a master code.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, nodes and/or other circuit-type depictions (e.g., reference numerals 102 and 212 of FIGS. 1 and 2) depict a circuit as described herein. Such circuits or circuitry are used together with other elements to exemplify how certain embodiments may be carried out in the form of structures, steps, functions, operations, activities, etc. For example, in certain of the above-discussed embodiments, one or more modules are discrete logic circuits or programmable logic circuits configured and arranged for implementing these operations/ activities, as may be carried out in the approaches shown in FIGS. 3A-3B and 5. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described at 228 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first circuit," a "second circuit," etc., where the circuit might be replaced with terms such as "circuitry" and others, the adjectives "first" and "second" are not used to connote any description of the structure or to provide any substantive meaning; rather, such adjectives are merely used for English-language antecedence to differentiate one such similarly-named structure from another similarly-named structure.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the activities illustrated by FIGS. 3A and 3B can be implemented using the circuitry illustrated by FIG. 1. As another example, the activities illustrated by FIGS. 2 and 5 can be combined with another or performed separately. Such modifications do not depart from the true spirit and scope of various aspects of the disclosure, including aspects set forth in the claims.

What is claimed is:

1. A communications apparatus comprising:
a plurality of communicatively-interconnected communications domains, each of the communications domains including circuits configured and arranged to communicate with one another by one or more channels conveying data in a wired communication network specific to the communications domain, and
an electronic switch, integrated as part of a first domain of the plurality of communicatively-interconnected communications domains, configured and arranged to communicate with other ones of the plurality of communicatively-interconnected communications domains and to effect secure wired communications of data over the one or more channels specific to the first domain, by using:
a first circuit configured and arranged to obtain and process sampled channel properties associated with the one or more channels specific to the first domain and the wired communication network, and
a second circuit configured and arranged to generate, in response to the first circuit, a domain-specific code that is generated pseudo-randomly using the processed sampled channel properties and a master code provided to the plurality of communicatively-interconnected communications domains, the domain-specific code being used by the electronic switch and circuits of the first domain for coding data conveyed over the one or more channels specific to the first domain and being uniquely specific to the first domain relative to other domains in the plurality of the communication domains.

2. The apparatus of claim 1, wherein the electronic switch is further configured and arranged to communicate, via the one or more channels specific to the first domain, the domain-specific code to the circuits integrated as part of the first domain, wherein the sampled channel properties and the domain-specific code are uniquely specific to the first domain relative to the other domains in the plurality.

3. The apparatus of claim 1, wherein the second circuit is further configured and arranged to generate the domain-specific code using the master code provisioned to the plurality of circuits, including the electronic switch, forming the wired communication network, the sampled channel properties obtained from at least a portion of the circuits of the first domain, and a key derivative function.

4. The apparatus of claim 1, wherein the second circuit is further configured and arranged to:
generate the domain-specific code using a combination or mixture of the sampled channel properties obtained from circuits integrated as part of the first domain; and generate an inter-domain code using the sampled channel properties, the electronic switch being configured and arranged with a second electronic switch to use the inter-domain code to code data conveyed between the first domain and other ones of the plurality of communicatively-interconnected communications domains.

5. The apparatus of claim 1, wherein the second circuit is further configured and arranged to generate the domain-specific code using a combination or mixture of the sampled channel properties obtained from a subset of the circuits integrated as part of the first domain.

6. The apparatus of claim 1, wherein the electronic switch is further configured and arranged to securely communicate, using the master code provisioned to the circuits of the wired communication network, the sampled channel properties to a second electronic switch of a second domain of the plurality of communicatively-interconnected communications domains and receive other sampled channel properties obtained by the second electronic switch and from other circuits of a plurality of circuits circuit forming the second domain.

7. The apparatus of claim 6, wherein the second circuit is further configured and arranged to generate an inter-domain code that is generated pseudo-randomly using the sampled channel properties specific to the first domain and the other sampled channel properties specific to the second domain, wherein the electronic switch and the second electronic switch are configured and arranged to use the inter-domain code to code data conveyed between the first domain and the second domain, and the domain-specific code is an intra-domain code used to code data conveyed within the first domain.

8. In a wired communication network including a plurality of communicatively-interconnected communications domains, each of the communications domains being configured to communicate with one another and including circuits configured and arranged to communicate with one another by one or more channels conveying data in the wired communication network specific to the communication domains, a communications apparatus comprising:
   an electronic switch, integrated as part of a first domain of the plurality of communicatively-interconnected communications domains, configured and arranged to effect secure communications of data over the one or more channels specific to the first domain, by:
   using a first circuit configured and arranged to obtain and process sampled channel properties associated with the one or more channels specific to the first domain and the wired communication network, and
   using a second circuit configured and arranged to generate, in response to the first circuit, a domain-specific code that is generated pseudo-randomly using the processed sampled channel properties specific to the first domain and a master code provided to the plurality of communicatively-interconnected communications domains, the domain-specific code being used for coding data conveyed over the one or more channels specific to the first domain.

9. The apparatus of claim 8, wherein the electronic switch is configured and arranged to communicate the domain-specific code to the circuits forming the first domain.

10. The apparatus of claim 8, wherein a master code is provisioned to each of the circuits integrated as part of the wired communication network, and the second circuit is further configured and arranged to generate the domain-specific code using the master code, the sampled channel properties, and a key derivative function.

11. The apparatus of claim 8, wherein the sampled channel properties include Digital Signal Processor (DSP) channel parameters and the electronic switch includes the first circuit that is further is configured and arranged to obtain the sampled channel properties by measuring the DSP channel parameters of channels associated with the first domain.

12. The apparatus of claim 8, wherein the second circuit is further configured and arranged to combine, mix, or randomly use the sampled channel properties to generate a plurality of domain-specific codes that are uniquely specific to the first domain relative to the other domains of the plurality.

13. The apparatus of claim 8, further including another electronic switch integrated as part of a second domain of the plurality of communicatively-interconnected communications domains, configured and arranged to effect secure communications of data over the one or more channels specific to the second domain, by using:
   another first circuit configured and arranged to obtain and process sampled channel properties associated with the one or more channels specific to the second domain and the wired communication network, and
   another second circuit configured and arranged to generate, in response to the other first circuit, a domain-specific code that is generated pseudo-randomly using the processed sampled channel properties, the domain-specific code being used for coding data conveyed over the one or more channels specific to the second domain.

14. The apparatus of claim 13, wherein the electronic switch and the other electronic switch are further configured and arranged to securely communicate, using a master code provisioned to all circuits of the wired communication network, the sampled channel properties of the respective first and second domains to one another.

15. The apparatus of claim 14, wherein the electronic switch and the other electronic switch are further configured and arranged to generate an inter-domain code that is generated pseudo randomly using the communicated sampled channel properties specific the first and second domains, the inter-domain code being used for secure communications between the first domain and the second domain.

16. A wired communication network including plurality of communicatively-interconnected communications domains, each of the communications domains including circuits configured and arranged to communicate with one another by one or more channels conveying data in a wired communication network specific to the communications domains, and a communications apparatus comprising:
   an electronic switch, integrated as part of a first domain of the plurality of communicatively-interconnected communications domains, wherein the electronic switch is configured and arranged to effect secure communications of data over the one or more channels specific to communications between the first domain and a second domain of the plurality of communicatively-interconnected communications domains, by
   using a first circuit configured and arranged to obtain and process sampled channel properties associated with the one or more channels specific to the first domain and the wired communication network,
   communicating, with another electronic switch integrated as part of the second domain of the plurality of communicatively-interconnected communications domains, other sampled channel properties associated with the one or more channels specific to the second domain and the wired communication network, using a second circuit configured and arranged to generate, in response to the first circuit and the communication, an inter-domain code that is generated pseudo-randomly using the processed sampled channel properties and the communicated sampled channel properties, the inter-domain code being used for coding data conveyed over one or more channels specific to communications between the first domain and the second domain, and using the second circuit to generate a domain-specific code using the processed sampled channel properties specific to the first domain and a master code provided to the plurality of communicatively-interconnected communications domains, and using the domain-specific code to communicate between circuits within the first domain, the domain-specific code being different than the inter-domain code.

17. The network of claim 16, wherein the second circuit is further configured and arranged to generate, in response to the first circuit, a domain-specific code that is generated pseudo-randomly using the processed sampled channel properties specific to the first domain, the domain-specific code being used for coding data conveyed over the one or more channels specific to the first domain.

18. The network of claim 16, further including the other electronic switch, integrated as part of the second domain of the plurality of communicatively-interconnected communications domains, configured and arranged to effect secure communications of data over the one or more channels specific to the second domain, by using:

another first circuit configured and arranged to obtain and process the sampled channel properties associated with the one or more channels specific to the second domain and the wired communication network, and another second circuit configured and arranged to generate, in response to the other first circuit, a domain-specific code that is generated pseudo-randomly using the processed sampled channel properties specific to the second domain, the domain-specific code being used for coding data conveyed over the one or more channels specific to the second domain.

19. The network of claim 18, wherein the electronic switch is further configured and arranged to communicate the sampled channel properties associated with the one or more channels specific to the first domain and the wired communication network to the other electronic switch, and the other electronic switch is configured and arranged to effect secure communications of data over the one or more channels specific to communications between the first domain and a second domain of the plurality of communicatively-interconnected communications domains, by:

using the other second circuit configured and arranged to generate, in response to the first circuit and the communication, the inter-domain code that is generated pseudo-randomly using the processed sampled channel properties and the communicated sampled channel properties, the inter-domain code being used for coding data conveyed over one or more channels specific to communications between the first domain and the second domain.

20. The network of claim 18, wherein the other electronic switch is further configured and arranged to encode the other sampled channel properties associated with the one or more channels specific to the second domain using a master code.

* * * * *